(12) United States Patent
Meisriemel

(10) Patent No.: US 12,157,143 B2
(45) Date of Patent: Dec. 3, 2024

(54) UV IRRADIATION APPARATUS FOR COATING SYSTEMS AND QUALITY ASSURANCE METHOD

(71) Applicant: Robert Bürkle GmbH, Freudenstadt (DE)

(72) Inventor: Oliver Meisriemel, Königsbach-Stein (DE)

(73) Assignee: Robert Bürkle GmbH, Freudenstadt (DE)

( * ) Notice: Subject to any disclaimer, the term of this patent is extended or adjusted under 35 U.S.C. 154(b) by 265 days.

(21) Appl. No.: 17/739,283

(22) Filed: May 9, 2022

(65) Prior Publication Data

US 2022/0355336 A1 Nov. 10, 2022

(30) Foreign Application Priority Data

May 10, 2021 (DE) .......................... 102021112174.4

(51) Int. Cl.
*B05D 3/06* (2006.01)
*F21V 7/00* (2006.01)
(Continued)

(52) U.S. Cl.
CPC ............ *B05D 3/067* (2013.01); *F21V 11/183* (2013.01); *G01J 1/429* (2013.01); *F21V 7/00* (2013.01)

(58) Field of Classification Search
CPC ...... F21V 14/003; F21V 14/006; F21V 14/02; F21V 14/025; F21V 14/04; F21V 14/045;
(Continued)

(56) References Cited

U.S. PATENT DOCUMENTS 3,819,929 A * 6/1974 Newman ............. B41F 23/0409
355/71
5,635,714 A * 6/1997 Nablo ..................... H01J 33/00
250/492.1
(Continued)

FOREIGN PATENT DOCUMENTS

DE 19944380 A1 3/2001
DE 102004023539 A1 3/2005
(Continued)

OTHER PUBLICATIONS

Extended European Search Report dated Sep. 15, 2022 for European Patent Application No. 22171980.0.

*Primary Examiner* — Sean M Luck
(74) *Attorney, Agent, or Firm* — Volpe Koenig

(57) ABSTRACT

A UV irradiation apparatus for coating systems that coat rigid or film-like workpieces, in particular furniture parts, having a transport apparatus for transporting workpieces provided with coating material from an inlet to an outlet through the UV irradiation apparatus, a UV light source arranged above the transport apparatus that irradiates the coated workpieces with UV light in an irradiation region between the inlet and the outlet, and a reflector or cover which shields the UV light source upward. A housing covers the irradiation region and the UV light source, which generally extends above the transport apparatus. A sensor of a measuring apparatus for direct or indirect automated measurement of radiant flux of the UV light source is arranged in the housing, and the sensor is in particular fitted fixed or movably on the housing or a holder. A method for quality assurance using this UV irradiation apparatus is also provided.

34 Claims, 2 Drawing Sheets

(51) Int. Cl.
*F21V 11/18* (2006.01)
*G01J 1/42* (2006.01)

(58) Field of Classification Search
CPC ........ F21V 14/06; F21V 14/065; F21V 14/08;
F21V 14/085; F21V 11/183; F21V 7/00;
B05D 3/067; G01J 1/429
See application file for complete search history.

(56) References Cited

U.S. PATENT DOCUMENTS

| | | | | |
|---|---|---|---|---|
| 7,225,915 | B2 * | 6/2007 | Kelly | B65G 45/22 |
| | | | | 198/494 |
| 8,038,282 | B2 * | 10/2011 | Claeys | B41F 23/0409 |
| | | | | 347/102 |
| 8,309,421 | B2 | 11/2012 | Yang et al. | |
| 8,584,612 | B2 * | 11/2013 | Hart | H01L 21/02041 |
| | | | | 392/407 |
| 8,735,850 | B2 * | 5/2014 | Fletcher | A61L 2/24 |
| | | | | 250/455.11 |
| 9,370,600 | B1 * | 6/2016 | DuPuis | F21V 14/08 |
| 10,046,920 | B1 * | 8/2018 | Green | B65G 45/22 |
| 2005/0133740 | A1 * | 6/2005 | Gardner | G01J 3/0272 |
| | | | | 250/504 R |
| 2006/0261291 | A1 * | 11/2006 | Gardner | F21V 9/45 |
| | | | | 250/504 R |
| 2007/0187027 | A1 * | 8/2007 | Tausch | B41F 23/0409 |
| | | | | 156/359 |
| 2011/0308917 | A1 * | 12/2011 | Lathem | A61L 2/10 |
| | | | | 250/492.1 |

FOREIGN PATENT DOCUMENTS

| | | |
|---|---|---|
| DE | 102011079531 A1 | 1/2013 |
| DE | 102012110475 A1 | 5/2014 |
| KR | 101653043 B1 | 8/2016 |
| WO | 2012/009353 A1 | 1/2012 |
| WO | 2018/197397 A1 | 11/2018 |

* cited by examiner

UV IRRADIATION APPARATUS FOR COATING SYSTEMS AND QUALITY ASSURANCE METHOD

INCORPORATION BY REFERENCE

The following documents are incorporated herein by reference as if fully set forth: German Patent Application no. 10 2021 112 174.4, filed May 10, 2021.

TECHNICAL FIELD

The invention relates to a UV irradiation apparatus for coating systems, in particular spray, roller and curtain coating systems, for the coating of film-like or rigid, in particular panel-shaped, workpieces, in particular furniture parts, in a continuous throughput method, and to a method for quality assurance in such a UV irradiation apparatus for partial or full crosslinking or curing of the coating of freshly coated workpieces, in particular furniture parts.

BACKGROUND

A UV irradiation apparatus of the present type is used above all for crosslinking or curing a coat freshly applied onto panel-shaped workpieces; it is in this case arranged downstream of the spray or curtain coating machines or the roller application machines for applying a coat onto the panel-shaped workpieces in a spray, roller or curtain coating system, in order to irradiate a freshly applied UV coat layer with UV light and thereby cause partial polymerization and/or full curing of the coat layer.

Spray, roller and curtain coating systems for applying UV-curable coats are used particularly for the coating of veneered furniture parts, floor parts, parquet elements and wood-based panels of all types, in particular fiberboard panels. Particularly in spray coating systems, workpieces which do not have a plane surface may also be coated.

UV-curable coats are cost-efficient and economical in terms of resources since they substantially make do without solvents that evaporate during the drying of the coat layer. For this reason, they are more environmentally friendly than conventional coats containing solvents. They do, however, have specific challenges relating to curing since the UV light shone into the freshly applied coat layer must introduce a certain amount of light or minimum radiant energy per coat volume into the coat layer in order to initiate the crosslinking of the coat and sustain it until the crosslinking and therefore the curing of the coat is completed. If too little energy is shone in, the coat will not be fully cured, which can scarcely be identified in coating systems operating in an automated fashion and in case of uncertainty is not noticeable until during the further processing of the coated objects or even with the customer.

These advantages and particular challenges also apply to UV-curable coatings which may not be described as a coat in the narrow sense.

As a UV light source in a UV irradiation apparatus of the present type, it is conventional to use gas discharge tubes, in particular metal vapor lamps, and UV LED lamps. The UV light source is conventionally arranged above a transport apparatus which is used to transport freshly coated workpieces from an inlet to an outlet of the UV irradiation apparatus, so that the UV light source can irradiate the workpieces with UV light in an irradiation region provided between the inlet and the outlet. In some particular designs of UV irradiation apparatuses, workpieces are also irradiated from below, specifically through a transport apparatus which is transparent for UV light or even through the workpiece, if it is transmissive for UV light. In this case, the UV light source is arranged below the transport apparatus in order to irradiate a downwardly oriented irradiation region with UV light.

When gas discharge tubes are being used, a reflector conventionally shields the UV light source upward (or in the aforementioned particular design downward) and directs the UV light onto the irradiation region. UV LED lamps direct their UV light onto the irradiation region by means of an optical lens arrangement fitted on the front side of the LEDs, the LEDs being fastened at the rear on a cover which imparts mechanical strength to the LED array, ensures cooling of the LEDs and shields the UV light.

Not least for safety reasons, in both cases a housing is provided which covers the irradiation region and the UV light source and extends at least from the inlet to the outlet of the UV irradiation station above (in the particular version, as an alternative or in addition: below) the transport apparatus. Both the inlet and the outlet are generally provided with light protection curtains in order to protect any persons present from the UV light.

Conventional UV light sources often have very different luminosities or radiant intensities (radiant flux divided by solid angle, measured in W/sr) for the same power consumption. It is, however, particularly awkward that the radiant intensity of conventional UV light sources varies over time without this being identifiable from a variable power consumption.

For quality assurance, it is therefore essential to check initially and periodically the actual irradiance (radiant flux divided by receiving area, measured in $W/m^2$) shone into the irradiation region by the UV light source or the radiant flux, from which the irradiance may be calculated. To this end, a radiation measuring instrument is conventionally placed onto the transport apparatus and moved through the irradiation region with the UV light source turned on. Since such a radiation measuring instrument often cannot readily be transported through the inlet and the outlet of the UV irradiation station, in particular because light protection curtains cause obstruction or the internal width is not sufficient for the measuring instrument, periodic checking of the radiant flux for the irradiance is not very convenient is therefore often neglected.

SUMMARY

The object of the invention is to provide a UV irradiation station of the type mentioned in the introduction and a method for quality assurance in a UV irradiation station, with which quality assurance is simpler or improved in comparison with the aforementioned prior art.

This object is achieved by a UV irradiation apparatus having one or more of the features disclosed herein and by a method having one or more of the features disclosed herein. Preferred configurations of the UV irradiation apparatus according to the invention may be found below and in the claims; expedient refinements of the method according to the invention are also described below and in the claims.

A UV irradiation apparatus according to the present invention thus comprises a transport apparatus for transporting rigid or film-like workpieces freshly provided with coating material from an inlet to an outlet through the UV irradiation apparatus, a UV light source which is arranged above and/or below the transport apparatus in order to irradiate the coated workpieces with UV light in an irradiation region provided between the inlet and the outlet, a cover or a reflector which shields the UV light source on its side facing away from the irradiation region and directs the UV light onto the irradiation region in the case of the reflector, and a housing, for covering the irradiation region and the UV light source, which extends above and/or below the transport apparatus at least from the inlet to the outlet of the UV irradiation apparatus. A sensor of a measuring apparatus which is used for automated measurement of the radiant flux of the UV light source is arranged in the housing, the sensor in particular being fitted fixed or movably on the housing or on a holder. The radiant flux (radiation energy divided by time, with the SI unit watt) of the UV light source need not in this case be measured directly; it may also be calculated by measuring the radiant intensity (radiant flux divided by solid angle) or the irradiance (radiant flux divided by receiving area) of the radiant flux, i.e. measured indirectly. From the radiant flux or the irradiance, while taking into account the irradiation area, the distance of the UV light source from the irradiation area, the transport speed of the transport apparatus and optionally other parameters, the energy shone into the freshly applied coatings of the workpieces may be deduced.

The UV irradiation apparatus according to the invention therefore permits the quality assurance method according to the invention in which the radiant flux emitted by the UV light source may uncomplicatedly be checked or monitored, initially, periodically or even continuously. Any fluctuations or aging-induced reductions of the emitted radiant flux of the UV light source are therefore identified promptly before quality problems can occur in the curing (crosslinking) of the coating.

Particularly preferably when gas discharge tubes are used as a UV light source, the sensor of the measuring apparatus is arranged in a region inside the housing which is shielded by the reflector, and the reflector can be rotated around the UV light source in such a way that it directs the UV light selectively onto the sensor. This has the advantage that the sensor and optionally further parts of the measuring apparatus are exposed only temporarily to the UV light, which naturally increases the lifetime of the sensor and possibly of the measuring apparatus.

In this case, it is particularly preferred that the reflector can be rotated around the UV light source in such a way that it selectively shields the irradiation region from the UV light source, preferably in such a way that it directs the UV light upward (in particular cases downward, but in any event away from the irradiation region) into the housing. In this way, the irradiation region is screened when no workpieces are intended to be irradiated. This protects the transport apparatus from the UV light. The introduction of heat due to the irradiation with UV light is thus kept away from the irradiation region and relocated into the upper (or lower) part of the housing, where cooling or ventilation is generally provided anyway in order to prevent overheating of the UV light source. In this case, the sensor of the measuring apparatus may very simply be arranged fixed above (or below) the UV light source and the reflector.

The reflector of the UV irradiation apparatus according to the invention preferably has a reflector face which is composed of a family of straight lines parallel to the irradiation region and which is configured in particular as a sliced parabolic cylinder. This is particularly advantageous for UV light sources having an elongate shape. Expediently, such a reflector may be fitted so that it can be rotated about an axis on which the UV light source lies.

If UV LED lamps are used as UV light source, the sensor of the measuring apparatus may correspondingly be arranged in a region inside the housing which is shielded by the cover, the UV light source then being rotatable together with its cover, which is normally installed fixed in any case, in such a way that it directs the UV light selectively onto the sensor.

Preferably, the UV light source can be rotated together with the cover in such a way that the cover shields the irradiation region selectively from the UV light source. Preferably, the UV light source is held in such a way that it can rotate about its own axis.

The UV light source present as a UV LED lamp is expediently provided with an optical lens device in order to direct the UV light onto the irradiation region.

The sensor of the measuring apparatus may also be arranged in a region inside the housing which is shielded by the reflector or the cover, and the reflector or the cover may at the same time be provided with a closable opening or an adjustable aperture, by means of which the UV light can be output onto the sensor in order to carry out a measurement.

The sensor of the measuring apparatus, or optionally the entire measuring apparatus, may as an alternative also be held in such a way that it can move on the housing or a static holder, in order selectively to introduce it into the UV light that is directed onto the irradiation region or retract it therefrom; in the case of a UV LED lamp, the latter then does not need to be rotated about its longitudinal axis for measurement, and rotation of an optionally present reflector is also then not necessary.

In this case, the sensor is preferably introduced into the UV light directed onto the irradiation region only when there is no workpiece in the irradiation region, in particular when a space between two workpieces being transported through the irradiation region passes through the irradiation region. In this way, shadowing effects which may possibly have a detrimental effect on the outcome of the curing are avoided.

This arrangement of the sensor in the measurement position is suitable for measuring the radiant flux or an irradiance which is as similar as possible to the irradiance in the irradiation region. To this end, the sensor of the measuring apparatus is expediently held with a movement apparatus, which is in connection via a control device with a drive of the transport apparatus, on the housing or a static holder.

In order to be able to use economical sensors, which are generally not very UV-resistant, for the measurement of the radiant flux, a barrier apparatus may be provided for the sensor of the measuring apparatus in order to protect this sensor from UV light, as well as from introduction of heat and burdens due to dirt particles or aggressive gases, outside measurement times.

The housing of the UV irradiation apparatus according to the invention may be provided with a lifting apparatus in order to make it easier to introduce a radiation measuring instrument or radiometer into the irradiation region by means of the transport apparatus. This makes it simpler to verify the irradiance shone into the irradiation region from time to time by means of a radiometer which is introduced into the irradiation region on the transport apparatus.

A further preferred configuration of the UV irradiation apparatus according to the invention consists in a second UV light source, which can be activated as a function of the measurement values of the measuring apparatus, being kept as a reserve in the housing or in the vicinity thereof. In this case, it is expedient that when a threshold value for the irradiance or the radiant flux introduced per unit area into the irradiation region is fallen below and/or when a threshold value for the variation of the radiant flux of the UV light source is exceeded, the second UV light source kept as a substitute is activated. This makes it possible to run unmanned layering during the coating of workpieces, without entailing the risk of producing rejects in the event of a significant drop in the radiant flux of the UV light source.

In the method according to the invention, preferably by means of the measuring apparatus, at least in predetermined intervals or time windows, the radiant flux of the UV light source is determined and the irradiance (i.e. radiant flux per unit area of the irradiation region, that is to say radiant energy per unit time and unit area, measured in $W/m^2$) introduced into the irradiation region is calculated therefrom. From this, as a function of the transport speed of the transport apparatus, the energy introduced per unit area into the freshly coated workpieces may then be determined.

If this is also set in relation to the currently consumed power of the light source, conclusions may be drawn relating to the radiant efficiency and therefore the state of the UV light source.

By means of the measuring apparatus, besides an absolute measurement, in predetermined intervals or time windows, the radiant flux of the UV light source may also be determined relative to earlier measurements, which detects variations of the radiant flux as a function of the currently consumed power of the UV light source.

In this case, in the scope of the invention it is preferred that, when a threshold value for the irradiance introduced into the irradiation region is fallen below and/or when a threshold value for the variation of the radiant flux of the UV light source, which may be assessed by taking into account the consumed power of the UV light source, is exceeded, a warning is generated and/or a second UV light source kept as a substitute is activated.

The present invention may also be refined in that the power consumption of the UV light source is regulated as a function of the irradiance (radiant energy per time and area) introduced into the irradiation region and/or a variation of the radiant flux of the UV light source, in order to compensate for any deviations from the setpoint value of the irradiance or of the radiant flux. It is obvious that the quality assurance may thereby be automated and that this offers great advantages particularly for unmanned layering.

The invention may advantageously also be used to check the linearity of a power regulation or the characteristic curve of the UV light source by determining the irradiance introduced into the irradiation region and/or a variation of the radiant flux of the UV light source as a function of the currently consumed power of the UV light source, while the consumed power is varied, optionally in stages.

The irradiance shone into the irradiation region may for further optimization of the quality assurance be verified from time to time by means of a radiometer introduced into the irradiation region on the transport apparatus. The measuring apparatus according to the invention may thus be recalibrated progressively.

BRIEF DESCRIPTION OF THE DRAWINGS

Two exemplary embodiments of a UV irradiation station according to the invention and a method configured according to the invention will be described and explained in more detail below with the aid of the appended drawings, and this description may also disclose features that are essential to the invention, without the invention being restricted to the examples described.

DETAILED DESCRIPTION

Figure 1:
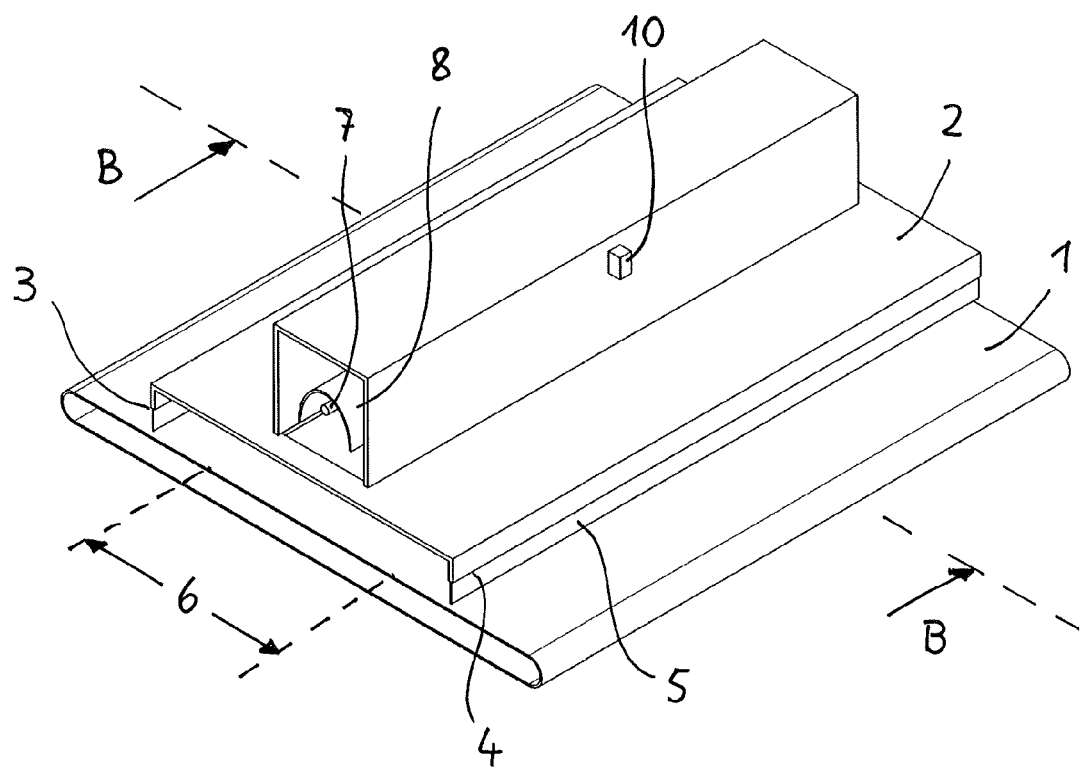
FIG. 1 shows a schematic isometric representation of a UV irradiation station, configured according to the invention, of a coating system.

FIG. 1 is an isometric representation (schematically) of a first exemplary embodiment of a UV irradiation station configured according to the invention. It comprises a transport apparatus 1, configured here as a revolving conveyor belt, onto which the panel-shaped workpieces (not represented) are placed, a housing 2 which lies above the transport apparatus 1 and extends from an inlet 3 to an outlet 4, both of the latter being sealed against UV light respectively with a light protection curtain 5.

Between the inlet 3 and the outlet 4, there is an irradiation region 6 in which the workpieces being transported on the transport apparatus 1 from the inlet 3 to the outlet 4 are irradiated with UV light in order to cure a freshly applied coat. Arranged above the irradiation region 6, inside the housing 2 that widens upward, there is a UV light source 7 which extends in the shape of a rod over the entire width of the irradiation region 6. In the present case, this is a tubular metal vapor lamp. It is provided with a reflector 8 which shields the UV light source 7 upward and directs the UV light onto the irradiation region 6.

Figure 2:
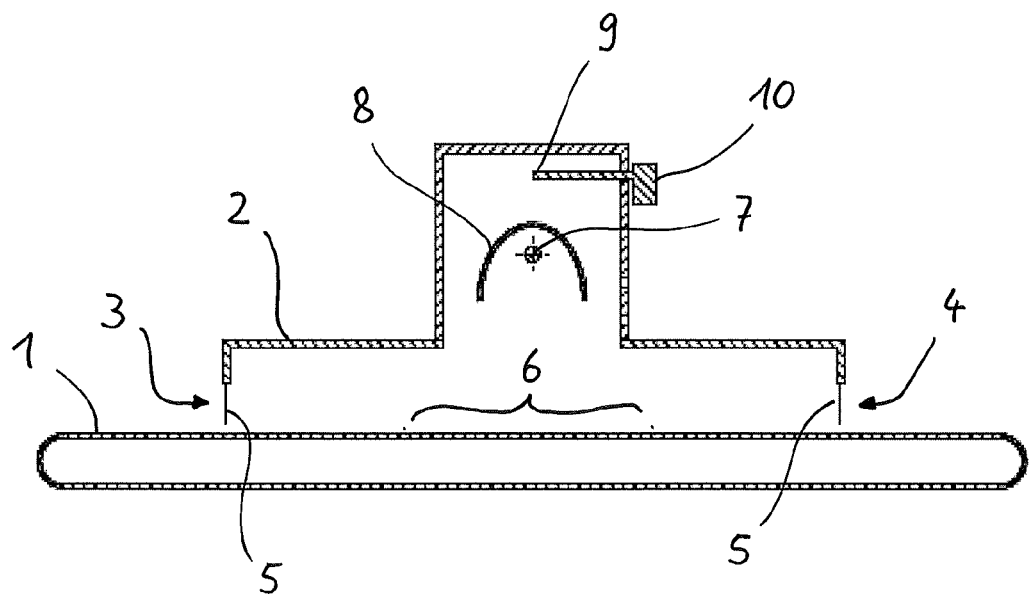
FIG. 2 shows a section in a lateral view through the UV irradiation station of FIG. 1.

FIG. 2 is a sectional representation along the plane B-B in FIG. 1. As may be seen here, a sensor 9 for UV light, which is part of a measuring apparatus 10 fastened on the housing 2, is seated above the reflector 8 in the housing 2.

The reflector 8 can be rotated about the longitudinal axis of the UV light source 7, in particular through 180°, so that it radiates the UV light of the UV light source 7 upward into the housing 2 and there, in particular, onto the sensor 9 of the measuring apparatus 10. At the same time, it screens the irradiation region 6 so that it no longer receives UV light during the measurement—and generally during production pauses.

Figure 3:
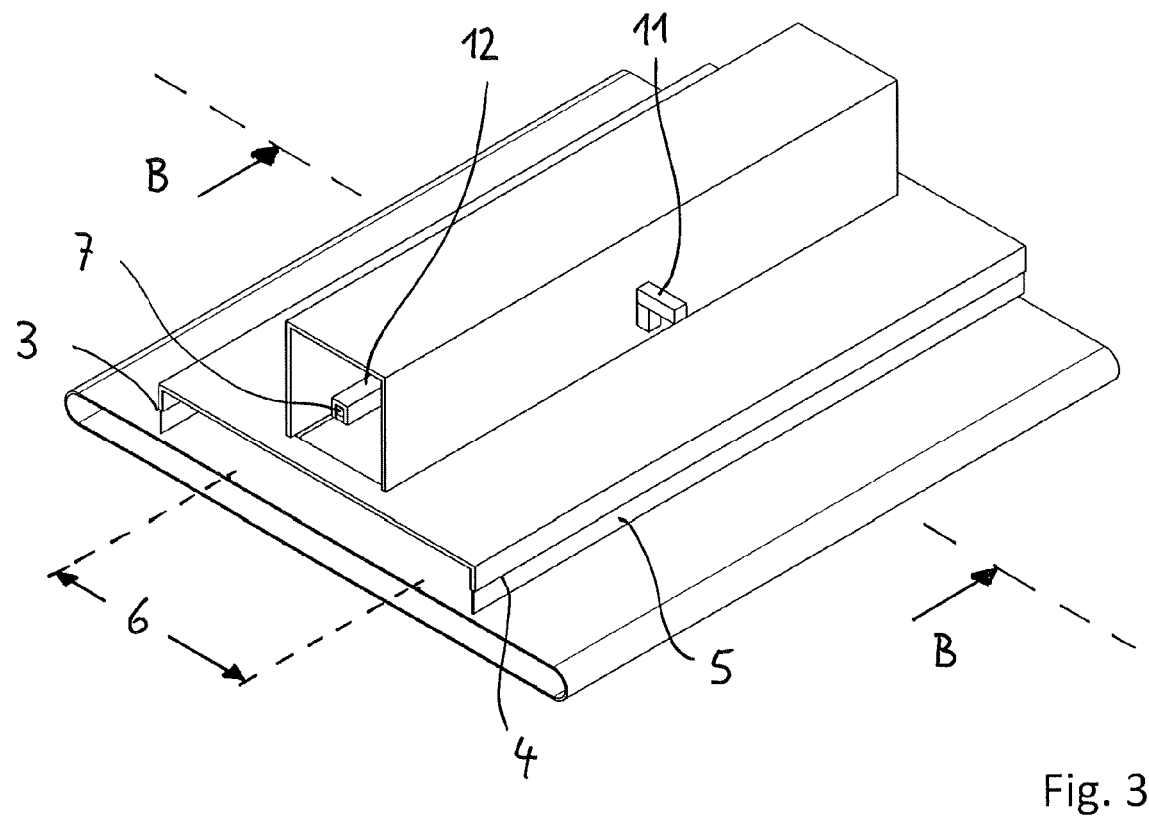
FIG. 3 shows a schematic isometric representation as in FIG. 1, but of a second exemplary embodiment.

FIG. 3 shows an alternative exemplary embodiment in a representation similar to FIG. 1. Elements that are the same are in this case provided with the same references, so that in this regard reference may mainly be made to the description of FIG. 1. This time, however, the UV light source 7 is configured as an LED UV light source and is correspondingly equipped on the front side (here directed downward) with an optical lens device and on the rear side and laterally with a cover 12, which at the same time is used as a frame of the LED arrays and for cooling thereof.

Figure 4:
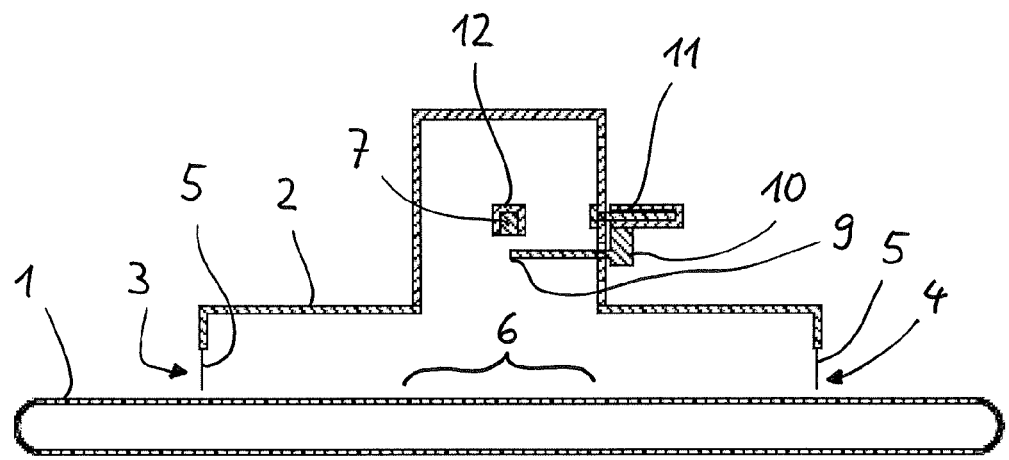
FIG. 4 shows a section as in FIG. 2, but of a second exemplary embodiment.

FIG. 4 is a sectional representation along the plane B-B of FIG. 3, corresponding to FIG. 2: here, the transport apparatus 1, the housing 2 with an inlet 3 and an outlet 4 and the irradiation region 6 are configured identically as in the previous exemplary embodiment. As mentioned above, the UV light source 7 is configured as an LED UV light source and is correspondingly equipped on the front side (here directed downward) with an optical lens device and on the rear side and laterally with a cover 12, which at the same time is used as a frame of the LED arrays and for cooling thereof. The measuring apparatus 10 is fastened together with its sensor 9 by means of a movement apparatus 11 on the housing 2 so that the sensor 9 can selectively be introduced into the UV light emitted into the irradiation region 6 by the UV light source 7, as shown in FIG. 3, or retracted from this UV light (not shown in FIG. 3). It is recommended to bring the sensor 9 into the measuring position shown only when there is no workpiece for curing in the irradiation region 6, in order to avoid shadowing effects. With a correspondingly small-format configuration of the sensor 9, however, the shadowing effects may be kept so small that they are insignificant and measurements may also be carried out during ongoing operation. Optionally, spaces between two workpieces travelling through may also be used for the measurement.

As the present exemplary embodiments make clear, the present invention thus makes it possible to observe a power drop of the UV light source 7 promptly in order to be able to avoid an inferior quality of the coated workpieces or even production of rejects. This leads to a very high process reliability, besides the advantage of the automation of monitoring, hitherto carried out manually, of the power emitted by the UV light source.

The process reliability is further increased significantly by regulation if a power drop of the UV light source 7 is identified, the radiant efficiency of the UV light source 7 being checkable at any time as a function of the consumed power.

The measuring apparatus 10 may be compared at any time with absolute values for the irradiance of the irradiation region 6 by a radiometer placed manually onto the transport apparatus 1, so that an initial calibration of the UV light source 7 and of the power consumed thereby is possible. The linearity of the radiant efficiency in the event of a varying consumed power may likewise be checked at any time according to the invention.

The invention claimed is:

1. A UV irradiation apparatus for coating systems that coat rigid or film-type workpieces, the apparatus comprising:
   - a transport apparatus (1) for transporting workpieces provided with coating material from an inlet (3) to an outlet (4);
   - a UV light source (7) which is arranged at least one of above or below the transport apparatus (1) configured to irradiate the workpieces with UV light for partial or full crosslinking and/or curing of the coating material in an irradiation region (6) provided between the inlet (3) and the outlet (4);
   - a cover (12) or a reflector (8) that shields the UV light source (7) on a side facing away from the irradiation region (6), at least the reflector (8) directing the UV light onto the irradiation region (6);
   - a housing (2), for covering the irradiation region (6) and the UV light source (7), which extends at least one of above or below the transport apparatus (1) at least from the inlet (3) to the outlet (4) of the UV irradiation apparatus; and
   - a sensor (9) of a measuring apparatus (10) configured for direct or indirect automated measurement of a radiant flux of the UV light source (7) arranged in the housing (2), the sensor (9) being located on the housing (2) or on a holder.

2. The UV irradiation apparatus according to claim 1, wherein the sensor (9) of the measuring apparatus (10) is arranged in a region inside the housing (2) which is shielded by the reflector (8), and the reflector (8) rotatable around the UV light source (7) such that the reflector is adapted to direct the UV light selectively onto the sensor (9).

3. The UV irradiation apparatus according to claim 2, wherein the reflector (8) is rotatable around the UV light source (7) such that the reflector selectively shields the irradiation region (6) from the UV light source (7).

4. The UV irradiation apparatus according to claim 1, wherein the reflector (8) has a reflector face which is comprised of a family of straight lines parallel to the irradiation region (6) and is configured as a parabolic cylinder.

5. The UV irradiation apparatus according to claim 4, wherein the reflector (8) is rotatably held for movement about an axis on which the UV light source (7) lies.

6. The UV irradiation apparatus according to claim 1, wherein the sensor (9) of the measuring apparatus (10) is arranged in a region inside the housing (2) which is shielded by the cover (12), and the UV light source (7) is rotatable together with the cover such that the UV light source directs the UV light selectively onto the sensor (9).

7. The UV irradiation apparatus according to claim 6, wherein the UV light source (7) is rotatable together with the cover (12) such that the cover (12) shields the irradiation region (6) selectively from the UV light source (7).

8. The UV irradiation apparatus according to claim 6, wherein the UV light source (7) comprises an optical lens device in order to direct the UV light onto the irradiation region (6).

9. The UV irradiation apparatus according to claim 8, wherein the UV light source (7) is rotatably for rotation about an axis thereof.

10. The UV irradiation apparatus according to claim 1, wherein the sensor (9) of the measuring apparatus (10) is arranged in a region inside the housing (2) which is shielded by the reflector (8), and the reflector (8) is provided with a closable opening or an adjustable aperture in order to output UV light onto the sensor (9).

11. The UV irradiation apparatus according to claim 1, wherein the sensor (9) of the measuring apparatus (10) is held movably on the housing (2) or a static holder, in order selectively to protrude into the UV light directed onto the irradiation region (6) or be retracted therefrom.

12. The UV irradiation apparatus according to claim 11, further comprising a movement apparatus that holds the sensor (9) of the measuring apparatus (10), and the movement apparatus (11) is in connection via a control device with a drive of the transport apparatus (1).

13. The UV irradiation apparatus according to claim 12, wherein the control device is programmed such that the sensor (9) is introduced into the UV light directed onto the irradiation region (6), and protrudes into the irradiation region (6), only when there is no workpiece in the irradiation region (6).

14. The UV irradiation apparatus according to claim 1, further comprising a barrier apparatus for the sensor (9) of the measuring apparatus (10) configured to protect the sensor from UV light outside measurement times.

15. The UV irradiation apparatus according to claim 1, wherein the housing (2) includes a lifting apparatus configured to introduce a radiometer into the irradiation region (6) with of the transport apparatus (1).

16. The UV irradiation apparatus according to claim 1, further comprising a second UV light source that is activatable as a function of the measurement values of the measuring apparatus located in or at the housing (2).

17. A method for quality assurance in a UV irradiation apparatus for partial or full crosslinking or curing of a coating of rigid or film-type workpieces provided with coating material in a coating system, the method comprising:
irradiating the workpieces provided with the coating material with UV light in a UV irradiation apparatus by transporting the workpieces using a transport apparatus (1) from an inlet (3) to an outlet (4) through an irradiation region (6) in which a UV light source (7), which is arranged at least one of above or below the transport apparatus (1), irradiates the workpieces with UV light for partial or full crosslinking and/or curing of the coating material in the irradiation region (6), wherein a cover (12) or a reflector (8) shields the UV light source (7) on a side of the UV light source (7) facing away from the irradiation region (6) and at least the reflector (8) directs the UV light onto the irradiation region (6), and a housing (2), which extends at least one of above or below the transport apparatus (1) at least from the inlet (3) to the outlet (4) of the UV irradiation apparatus, covers the irradiation region (6) and the UV light source (7); and
using a measuring apparatus (10) having a sensor (9) for direct or indirect automated measuring of a radiant flux of the UV light source (7), with the sensor (9) being arranged at least temporarily in the housing (2).

18. The method according to claim 17, further comprising arranging the sensor (9) of the measuring apparatus (10) in a region inside the housing (2) which is shielded by the reflector (8), and
rotating the reflector (8) from time to time around the UV light source (7) such that the reflector directs the UV light onto the sensor (9).

19. The method according to claim 18, wherein the reflector (8) is rotated around the UV light source (7) such that the reflector shields the irradiation region (6) from the UV light source (7) by directing the UV light away from the irradiation region (6).

20. The method according to claim 17, further comprising arranging the sensor (9) of the measuring apparatus (10) in a region inside the housing (2) which is shielded by the cover (12), and rotating the UV light source (7) from time to time together with the cover (12) such that the UV light source directs the UV light selectively onto the sensor (9).

21. The method according to claim 20, wherein the UV light source (7) is rotated together with the cover (12) such that the cover (12) shields the irradiation region (6) selectively from the UV light source (7).

22. The method according to claim 20, further comprising providing the UV light source (7) with an optical lens device for directing the UV light onto the irradiation region (6).

23. The method according to claim 22, further comprising rotating the UV light source (7) about an axis thereof.

24. The method according to claim 17, further comprising selectively introducing the sensor (9) of the measuring apparatus (10) which is held movably on the housing (2) or movably on a static holder into the UV light directed onto the irradiation region (6), and then retracting the sensor (9) therefrom.

25. The method according to claim 24, further comprising introducing the sensor (9) of the measuring apparatus (10) into the UV light directed onto the irradiation region (6) only when there is no workpiece in the irradiation region (6).

26. The method according to claim 17, further comprising using the measuring apparatus (10), at least in predetermined intervals or time windows, for determining the radiant flux of the UV light source (7) and calculating an irradiance introduced into the irradiation region (6) therefrom.

27. The method according to claim 17, further comprising using the measuring apparatus (10), in predetermined intervals or time windows, for determining the radiant flux of the UV light source (7) absolutely or relative to earlier measurements, and detecting variations of the radiant flux as a function of a currently consumed power of the UV light source (7).

28. The method according to claim 27, further comprising generating a warning when a threshold value for the irradiance introduced into the irradiation region (6) at least one of falls below or exceeds a threshold value for the variation of the radiant flux of the UV light source (7), as a function of the consumed power of the UV light source (7).

29. The method according to claim 27, further comprising regulating the power consumption of the UV light source (7) is regulated as a function of at least one of the irradiance introduced into the irradiation region (6) or a variation of the radiant flux of the UV light source (7).

30. The method according to claim 27, further comprising checking a linearity of a power regulation or a characteristic curve of the UV light source (7) by determining at least one of the irradiance introduced into the irradiation region (6) or a variation of the radiant flux of the UV light source (7) as a function of the currently consumed power of the UV light source (7).

31. The method according to claim 30, further comprising regulating the consumed power of the UV light source (7) by an electronic ballast unit, while taking into account the determined characteristic curve of the UV light source (7).

32. The method according to claim 26, further comprising activating a second UV light source when at least one of the radiant flux or the irradiance introduced falls below a threshold value or the variation of the radiant flux of the UV light source (7) exceeds a threshold value.

33. The method according to claim 26, further comprising at least one of verifying ore recalibrating the irradiance shone into the irradiation region (6) from time to time using a radiometer introduced into the irradiation region (6) on the transport apparatus (1).

34. The method according to claim 26, further comprising determining a radiant energy per unit area (exposure) introduced into a coated workpiece from the irradiance shone into the irradiation region (6) and the transport speed.

* * * * *